United States Patent
Keller et al.

(10) Patent No.: US 9,856,035 B1
(45) Date of Patent: Jan. 2, 2018

(54) SYSTEMS AND METHODS FOR DYNAMIC LIGHT CONTROL

(71) Applicant: Goodrich Corporation, Charlotte, NC (US)

(72) Inventors: Steven T. Keller, Union, OH (US); Andre Hessling von Heimendahl, Koblenz (DE)

(73) Assignee: GOODRICH CORPORATION, Charlotte, NC (US)

( * ) Notice: Subject to any disclaimer, the term of this patent is extended or adjusted under 35 U.S.C. 154(b) by 76 days.

(21) Appl. No.: 15/178,208

(22) Filed: Jun. 9, 2016

(51) Int. Cl.
*B64D 47/04* (2006.01)
*F21S 8/10* (2006.01)
*B64C 19/00* (2006.01)

(52) U.S. Cl.
CPC .............. *B64D 47/04* (2013.01); *B64C 19/00* (2013.01); *F21S 48/1742* (2013.01)

(58) Field of Classification Search
CPC ........ B64D 47/04; B64D 47/02; B64C 19/00; F21S 48/1742
See application file for complete search history.

(56) References Cited

U.S. PATENT DOCUMENTS

| 4,233,652 A | | 11/1980 | Oswald | |
|---|---|---|---|---|
| 5,863,277 A | * | 1/1999 | Melbourne | ........... B60W 10/06 123/339.19 |
| 9,663,223 B1 | * | 5/2017 | Harrison | ................. B64C 19/00 |
| 2012/0133283 A1 | * | 5/2012 | Everett | ............. H05B 37/0227 315/77 |
| 2012/0268959 A1 | * | 10/2012 | Barnett | .................. B64D 47/04 362/470 |
| 2013/0197739 A1 | * | 8/2013 | Gallagher | ................. B64F 5/60 701/31.5 |
| 2015/0146442 A1 | | 5/2015 | Bonnefous, et al. | |

OTHER PUBLICATIONS

Wojciech Pryzbylski, Aircraft lights—when to use?, Nov. 28, 2015.*

* cited by examiner

*Primary Examiner* — Abby Y Lin
(74) *Attorney, Agent, or Firm* — Snell & Wilmer L.L.P.

(57) ABSTRACT

A light system for an aircraft is provided. A light system may include a sensor and a first aircraft light. A controller may be coupled to the sensor and the first aircraft light and may perform operations including receiving data from the sensor, determining a status of the aircraft based on the data, and controlling the first aircraft light based on the status of the aircraft. The first aircraft light may include an external aircraft light and the operations may further include at least one of activating or deactivating the external aircraft light based on the status of the aircraft.

17 Claims, 6 Drawing Sheets

SYSTEMS AND METHODS FOR DYNAMIC LIGHT CONTROL

FIELD

The present disclosure relates to aircraft systems, and, more specifically, to aircraft lighting systems.

BACKGROUND

Commercial aircraft typically employ an external light system with various lights used during taxiing, takeoff, and landing for the purpose of illuminating an area around the aircraft for visibility for the pilot. The external light system may include taxi lights, runway turnoff lights, takeoff lights, landing lights, anti-collision lights, navigation lights, ice detection lights, emergency lights, cargo lights, logo lights and/or novelty lights, among other lights. Taxi lights and runway turnoff lights may be useful for aircraft travel while on the ground, for example, when taxiing to and from a gate and a runway. Takeoff and landing lights may be useful during takeoff and landing. During the various operational stages of taxiing, takeoff, and landing, the pilot may switch on and off various external lights. As the pilot manages the complicated aircraft systems, the pilot performs a number of tasks, wherein the task load for the pilot may be particularly high during takeoff, landing, and taxiing.

SUMMARY

Systems for landing light control are disclosed herein. A light system for an aircraft is provided. A light system may include a sensor and a first aircraft light. A controller may be coupled to the sensor and the first aircraft light and may perform operations including receiving data from the sensor, determining a status of the aircraft based on the data, and controlling, by the controller, the first aircraft light based on the status of the aircraft.

In various embodiments, the first aircraft light may include an external aircraft light. The operations may further include receiving, by the controller, a brake signal from the brake sensor. In various embodiments, the sensor may comprise a weight-on-wheels sensor and the first aircraft light may comprise a landing light. The operations may further include determining, by the controller, based on the data whether a landing gear of the aircraft is in contact with a ground, and deactivating, by the controller, the landing light in response to the landing gear being in contact with the ground. In various embodiments, the light system may further include a second aircraft light including a takeoff light. The operations may further comprise activating, by the controller, the takeoff light in response to the landing gear being in contact with the ground. The sensor may comprise an aircraft data source and the first aircraft light may comprise a landing light. The operations may further comprise activating, by the controller, the landing light upon determining an altitude of the aircraft is below a first threshold. The sensor may comprise a wheel speed sensor and the first aircraft light may comprise a taxi light. The operations may further comprise activating, by the controller, the taxi light in response to a wheel speed being below a second threshold. The sensor may comprise a brake sensor and the first aircraft light may comprise a runway turnoff light. The operations may further comprise activating, by the controller, the runway turnoff light in response to a brake signal from the brake sensor.

An article of manufacture may include a non-transitory, tangible computer readable storage medium having instructions stored thereon that, in response to execution by a controller, cause the controller to perform operations. The operations may include receiving, by the controller, data from a sensor, determining, by the controller, a status of the aircraft based on the data, and controlling, by the controller, a first aircraft light based on the status of the aircraft.

In various embodiments, the first aircraft light may include an external aircraft light. The operations may further include receiving, by the controller, a brake signal from the brake sensor. In various embodiments, the sensor may comprise a weight-on-wheels sensor and the first aircraft light may comprise a landing light. The operations may further include determining, by the controller, based on the data whether a landing gear of the aircraft is in contact with a ground, and deactivating, by the controller, the landing light in response to the landing gear being in contact with the ground. In various embodiments, the light system may further include a second aircraft light including a takeoff light. The operations may further comprise activating, by the controller, the takeoff light in response to the landing gear being in contact with the ground. The sensor may comprise an aircraft data source and the first aircraft light may comprise a landing light. The operations may further comprise activating, by the controller, the landing light upon determining an altitude of the aircraft is below a first threshold. The sensor may comprise a wheel speed sensor and the first aircraft light may comprise a taxi light. The operations may further comprise activating, by the controller, the taxi light in response to a wheel speed being below a second threshold.

A method of controlling a light system of an aircraft may comprise the steps of receiving, by a controller, data from a sensor, determining, by the controller, a status of the aircraft based on the data, and controlling, by the controller, a first aircraft light based on the status of the aircraft.

In various embodiments, the first aircraft light may include an external aircraft light. The controlling the first aircraft light may further comprise at least one of activating or deactivating, by the controller, the external aircraft light based on the status of the aircraft. The sensor may comprise a weight-on-wheels sensor and the first aircraft light may comprise a landing light. The method may further include determining, by the controller, based on the data whether a landing gear of the aircraft is in contact with a ground, and deactivating, by the controller, the landing light in response to the landing gear being in contact with the ground. The method may further include determining, by the controller, an altitude of the aircraft, and activating, by the controller, the landing light upon determining the altitude of the aircraft is below a first threshold. The method may further include activating, by the controller, a second aircraft light in response to the landing gear being in contact with the ground. The second aircraft light may comprise a takeoff light. The first aircraft light may include a taxi light. The controlling the first aircraft light may further comprise activating, by the controller, the taxi light in response to a wheel speed being below a second threshold.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Systems and methods are disclosed herein that provide for controlling an aircraft lighting system. In accordance with various embodiments, an aircraft lighting system including a controller may determine an operational state or status of an aircraft, for example, whether the aircraft is parked, taxiing, taking off, in flight, landing, or on approach for landing. Based on the operational state of the aircraft, the controller of the aircraft lighting system may activate and deactivate, i.e., turn on or off or control a brightness of, various aircraft lights, such as external lights including a taxi light, a runway turnoff light, a takeoff light, a landing light, emergency lights, logo or novelty lights, and/or other lights. By controlling the aircraft lights according to the aircraft operational state, a pilot may have improved visibility as well as a reduced task load. The systems and methods disclosed herein are suitable for use with various aircraft light systems, although there may be utility for use with other light systems.

Figure 1:
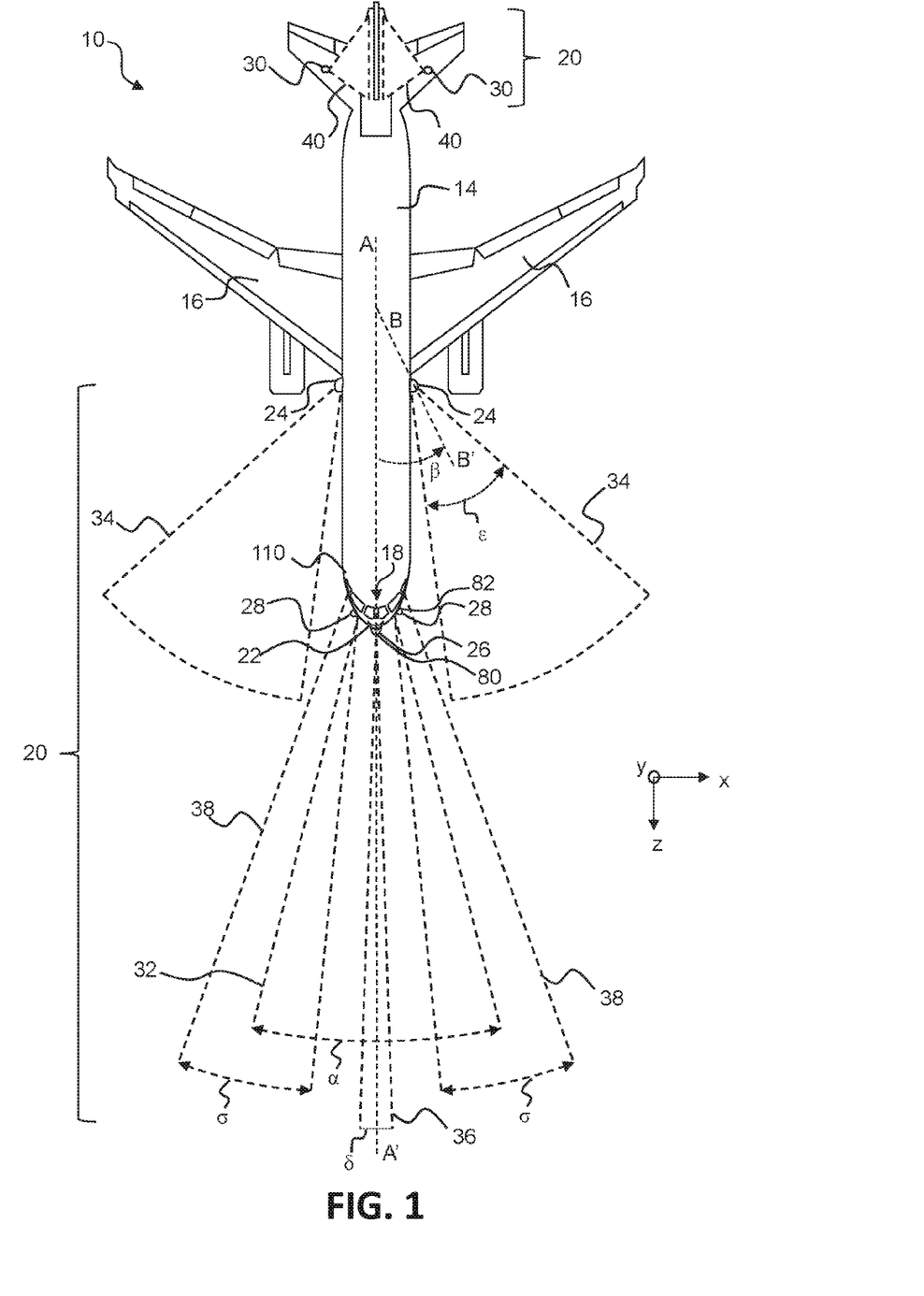
FIG. 1 illustrates a schematic view of an aircraft light system, in accordance with various embodiments.

In various embodiments and with reference to FIG. 1, an aircraft 10 including a light system 20 is shown. Aircraft 10 may comprise a fuselage 14, which may be coupled to and/or comprise a pair of wings 16. A nose 18 of aircraft 10 may be pointed along a central longitudinal axis A-A' of aircraft 10, for example, in a direction forward of fuselage 14. Central longitudinal axis A-A' is oriented in the z direction on the provided xyz axis. The direction that nose 18 of aircraft 10 is pointing may be referred to as a heading or pointing direction, and aircraft 10 is shown pointing in the z direction. In various embodiments, aircraft 10 includes light system 20 having a plurality of external and internal lights and a controller 110 for controlling the activation, deactivation, and/or brightness of the lights of light system 20. Light system 20 of aircraft 10 may comprise a plurality of aircraft lights 80, which may include exterior or external aircraft lights 82 that illuminate areas around the aircraft 10 while the aircraft 10 is on the ground or in flight. Light system 20 may comprise one or more external aircraft lights 82. An external aircraft light 82 may be a taxi light 22, a runway turnoff light 24, a takeoff light 26, a landing light 28, a logo light 30 and/or other aircraft lights, each of which may comprise one or more light sources, such as light-emitting diodes (LEDs), phosphorescent lights, high intensity discharge (HID) lights, incandescent lights, florescent lights, sealed beam lights or other suitable light source.

Taxi light 22 may be mounted to nose 18 or nose landing gear 104 (see FIG. 2) of aircraft 10 to illuminate the runway, for example, when aircraft 10 is on the ground. Taxi light 22 may be aimed forward of nose 18 horizontally along the xz plane, and forward in the z direction, along the central longitudinal axis A-A'. Taxi light 22 may illuminate a taxi light illumination area 32, which may be distributed laterally in the xz plane and which may have a lateral beam distribution angle α. Taxi light illumination area 32 may also have a vertical distribution, i.e., above and below the xz plane. An intensity of taxi light 22 may determine the distance of taxi light illumination area 32. The distance of taxi light illumination area 32 in the z direction may be about 80 meters, wherein "about" in this context only means +/−10 meters.

Runway turnoff light 24 may be mounted to nose 18, nose landing gear 104 (see FIG. 2), fuselage 14, wings 16, or other portion of aircraft 10 to illuminate the runway including curves or turnoffs of the runway, for example, when the aircraft is on the ground. Runway turnoff light 24 may be positioned on each of the left and right sides of aircraft 10 and may be aimed along a line B-B', which may be at an angle β about 45 degrees (°) from the central longitudinal axis A-A' in the xz plane, wherein "about" in this context only means +/−10°. From line B-B', along which runway turnoff light 24 is aimed, the runway turnoff light illumination area 34 may be distributed laterally in the xz plane and may have a lateral beam distribution angle E. Lateral beam distribution angle ε of runway turnoff light illumination area 34 may be about 40° centered at line B-B', wherein "about" in this context only means +/−10°. Runway turnoff light illumination area 34 may also have a vertical distribution, i.e., above and below the xz plane. Runway turnoff light 24 may illuminate an area to allow the pilot to see an area prior to turning. Runway turnoff light 24 may further be used an indication light to provide an indication to others of a travel direction of the aircraft.

Takeoff light 26 may be useful when aircraft 10 is taking off and/or landing. Takeoff light 26 may be aimed forward of nose 18 horizontally along the xz plane, and forward in the z direction, along the central longitudinal axis A-A'. Takeoff light 26 may illuminate a takeoff light illumination area 36, which may be distributed laterally in the xz plane and which may have a lateral beam distribution angle δ. Lateral beam distribution angle δ of takeoff light illumination area 36 may be about 3° centered along the central longitudinal axis A-A, wherein "about" in this context only means +/−1°. Takeoff light illumination area 36 may also have a vertical distribution, i.e., above and below the xz plane. An intensity of takeoff light 26 may determine the distance of takeoff light illumination area 36. Takeoff light 26 may be relatively a high intensity, narrow light beam. For example, takeoff light 26 may have a higher intensity and more narrow beam distribution angle as compared to taxi light 22 and landing light 28. Takeoff light illumination area 36 and taxi light illumination area 32 may partially overlap. For illustration purposes, takeoff light illumination area 36 and taxi light illumination area 32 are shown overlapping in the xz plane. Takeoff light illumination area 36 may reach a greater distance than taxi light illumination area 32, while taxi light illumination area 32 may have greater total lateral beam distribution angle in the xz plane, i.e., lateral beam distribution angle α may be greater than lateral beam distribution angle δ. Thus, takeoff light 26 may be more useful to a pilot when aircraft 10 is traveling at higher speeds, while taxi light 22 provides sufficient lighting during lower speed operations, such as during taxiing on the ground or when stopped or idling on the runway. The term "takeoff light" is used herein to refer to a light having the above characteristics described with respect to takeoff light 26, however, it will be understood that other terms, such as "landing light," may be used in the industry to refer to a light having similar characteristics, including being aimed horizontally in the xz plane for illumination of the runway.

Landing light 28 may be used to illuminate the runway when the aircraft is approaching the runway and/or during the take-off to improve aircraft visibility on approach and departure. For illustration purposes, FIG. 1 shows aircraft 10 with two landing lights 28 mounted near the nose 18 of aircraft 10. However, landing lights 28 may be mounted to other parts of aircraft 10, such as to landing gear, fuselage 14, wings 16, or other portion of aircraft 10, and may include fewer or greater than two lights. Landing light 28 may illuminate a landing light illumination area 38, which may be distributed laterally in the xz plane and which may have a lateral beam distribution angle σ. Landing light 28 may be aimed forward in the z direction, along the central longitudinal axis A-A' or may be aimed laterally outward, in the xz plane, from central longitudinal axis A-A', as shown in FIG. 1. Landing light 28 may further be aimed vertically downward, in the yz plane, from central longitudinal axis A-A', which may be horizontal with the ground. Landing light 28 may be aimed about 10° vertically downward from the horizontal xz plane of aircraft 10, wherein "about" in this context only means +/−5°. The term "landing light" is used herein to refer to a light having the above characteristics described with respect to landing light 28, however, it will be understood that other terms may be used in the industry to refer to a light having similar characteristics.

Figure 2:
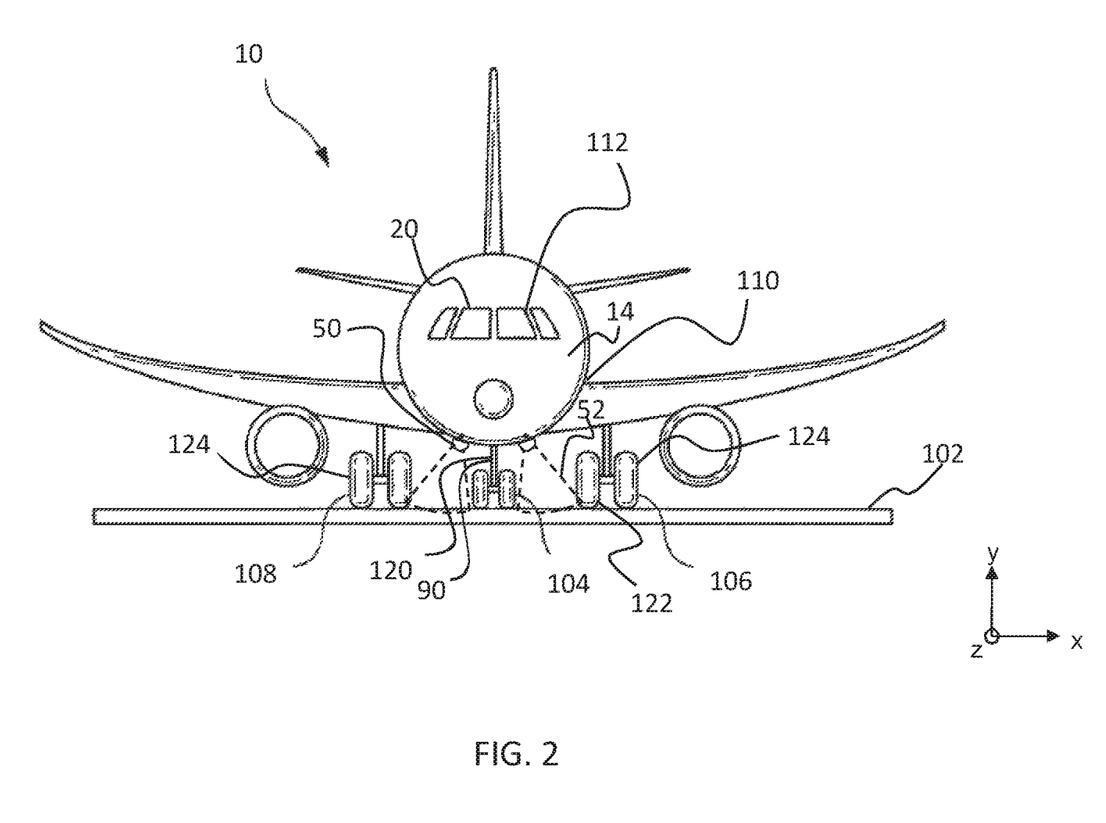
FIG. 2 illustrates landing gear of the aircraft, in accordance with various embodiments.

Logo light 30 may illuminate markings on the outer surface of aircraft 10, such as a commercial logo on the aircraft rudder. Logo light 30 may illuminate a logo light illumination area 40. For illustration purposes, FIG. 1 shows aircraft 10 with two logo lights 30, however it will be understood that light system 20 may include any number of logo lights 30 or other novelty lights. Referring to FIGS. 1 and 2, an example of novelty lights 50 are shown, in accordance with various embodiments. An aircraft light 80 may include a novelty light 50, which may be an external aircraft light 82. For illustration purposes, FIG. 2 shows novelty lights 50 aimed downward from fuselage 14 towards runway 102, in a negative y direction. Novelty lights 50 may illuminate a novelty light illumination area 52. Novelty lights 50 may illuminate, for example, runway 102 with colors, patterns, and/or project images or text. Novelty lights 50 may be used for visibility of the aircraft 10, for customizing an appearance of aircraft 10, or for visibility during maintenance of the aircraft 10, or for other purposes. Novelty lights 50 may generally be used when the aircraft 10 is stopped or parked. Thus, light system 20 may include a logo light 30 and/or a novelty light 50, each of which may be an aircraft light 80, and more specifically, may be an exterior or external aircraft light 82, controlled by a controller 110 as described herein.

In various embodiments, light system 20 may be configured to activate and/or deactivate the various aircraft lights according to the state or status of aircraft 10. Activating and deactivating taxi light 22, runway turnoff light 24, takeoff light 26, and landing light 28 at appropriate times during aircraft operation ensures that the travel path of the aircraft is illuminated with the proper light intensity and light direction to improve visibility for the pilot and to reduce pilot distractions caused by illumination at inappropriate times. Activating and deactivating logo light 30 and novelty lights 50 at appropriate times during aircraft operation may reduce a pilot's task load while operating aircraft 10.

With reference to FIG. 2, aircraft 10 on runway 102 is shown in a front view, looking forward to aft, in accordance with various embodiments. Aircraft 10 may comprise a right landing gear 108 and a left landing gear 106 each having one or more wheel and brake assemblies. Aircraft 10 may comprise a nose landing gear 104 with one or more wheels located under the nose of aircraft 10 and may not include a brake. Aircraft brakes are used to slow and/or stop the aircraft 10, and also may be used to steer the aircraft 10 during taxing. A steering system may be configured to steer a wheel of nose landing gear 104, i.e. nose wheel steering.

In various embodiments, light system 20 may include one or more sensors 90 in communication with (e.g., wired or wirelessly coupled) with a controller 110. A sensor 90 may comprise a weight-on-wheels (WOW) sensor 120, a wheel speed sensor 122, a brake sensor 124, an aircraft data source 112 or other sensor or combination thereof.

Aircraft 10 may comprise a controller 110 in communication with a brake system and/or a steering system to determine a status of aircraft 10. A brake system may be any device that allows a pilot to input braking commands to effect braking of landing gear 106, 108. An input may be one or more aircraft brake pedals, such as left and right brake pedals, operated by a pilot to produce braking commands. Each pedal may include a brake sensor 124 that detects and/or receives the respective brake signals from the pedals. As the pedals are depressed, each brake sensor 124 may generate a signal corresponding to the degree or angle of pedal deflection, and this signal can be provided to the brake system. The brake pedal signals may then be sent by the brake system to actuators of the brakes to apply braking. A brake sensor 124 may measure a brake pressure, wherein the brake pressure comprises the brake signal. As will be appreciated, other methods for generating the brake pedal signals may also be employed, including encoders, potentiometers, or the like.

Each landing gear 104, 106, 108 may further comprise a structure, for example a strut, bogie beam, axle and/or other structure, coupled to one or more wheels of the landing gear. When the aircraft is on the ground, the weight of the aircraft is transferred through the landing gear to the one or more axles and finally to the one or more wheels. In various embodiments, nose landing gear 104, left landing gear 106 and/or right landing gear 108 may comprise a weight-on-wheels (WOW) sensor 120 configured to detect whether the landing gear of aircraft 10 is on the ground. After takeoff, for example, a WOW sensor 120 may indicate there is no weight on wheels, thus indicating that the aircraft 10 is in flight.

In various embodiments, nose landing gear 104, left landing gear 106 and/or right landing gear 108 may include a wheel speed sensor 122 coupled to each respective wheel of the landing gear to measure one or more characteristics of each wheel, such as wheel position or displacement, wheel speed, and/or wheel acceleration, measured in terms of linear or angular position, linear or angular velocity, linear or angular acceleration, or other measurement unit. One or more wheel speed sensors 122 may detect and/or record a series of measurements about the landing gear wheels, where the measurements may correlate to wheel speed for each wheel. In various embodiments, wheel speed sensor 122 may detect the speed, acceleration, and/or displacement of a wheel. Wheel speed sensor 122 data may be used to determine, for example, aircraft velocity or acceleration during takeoff, landing and/or taxiing.

In various embodiments, light system 20 of aircraft 10 may further comprise a controller 110 in communication (e.g., wired or wirelessly coupled) with an aircraft data source 112, such as an avionics unit, and/or a plurality of sensors that detect aircraft status information. Aircraft status information may mean any information relating to the status of an aircraft, for example, whether aircraft 10 is parked, taxiing, taking off, climbing, cruising, descending, and/or landing. Aircraft data source 112 may include a plurality of sensors for measuring or determining avionics data such as altitude, pitch (angle of rotation about the x axis), roll (angle of rotation about the z axis), yaw (angle of rotation about the y axis), vertical speed, aircraft velocity (airspeed and/or groundspeed), aircraft acceleration, wheel position, wheel speed (wheel velocity), wheel acceleration, orientation, presence of weight on wheels, pressure applied to a brake stack during braking or other parameter or characteristic of the aircraft. Aircraft data source 112 may include a variety of sensor types, such as a global positioning system (GPS), accelerometer, gyroscopic sensor, radar sensor, and/or another device.

Referring now to FIGS. 1 and 2, controller 110 may operate to receive information from aircraft data source 112 and to produce an output to activate or deactivate one or more lights of light system 20 according to an operational state or status of aircraft 10. Controller 110 may be in electronic communication (e.g., wired or wirelessly coupled) with the lights of light system 20 and with one or more sensors, such as WOW sensor 120, wheel speed sensors 122, brake sensors 124, and/or aircraft data source 112. In various embodiments, controller 110 may determine a status of aircraft 10 based on data from WOW sensor 120, wheel speed sensors 122, brake sensors 124, and/or aircraft data source 112. Controller 110 may control aircraft lights 80 of light system 20 based on data from a sensor 90 and/or based on a status of aircraft 10 as determined based on data from a sensor 90. Controller 110 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

Figure 3:
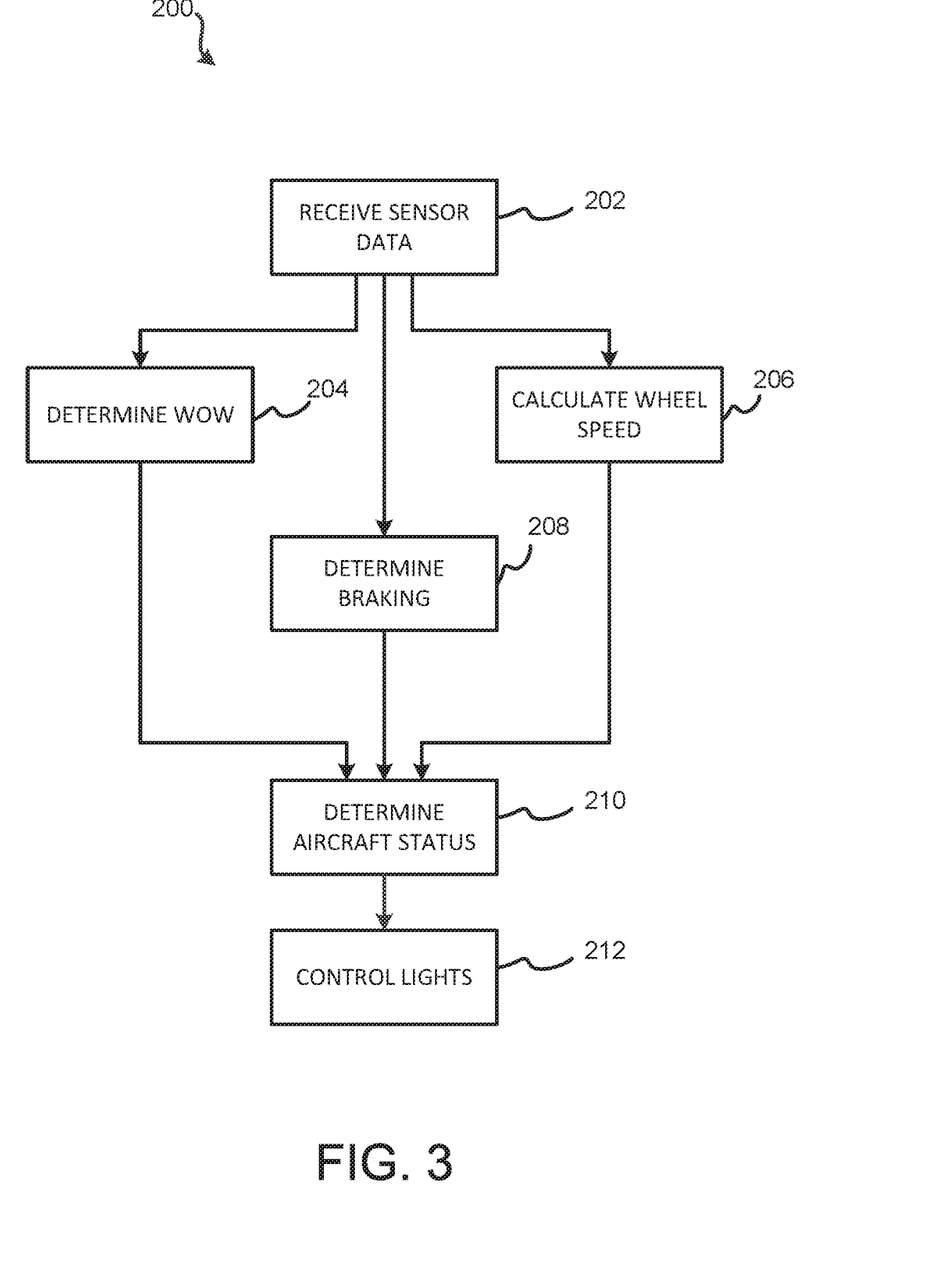
FIG. 3 illustrates a process of controlling an aircraft light system, in accordance with various embodiments.

With reference to FIG. 3, a flow chart illustrating a method 200 of controlling a light system 20 (of FIGS. 1 and 2) is shown, in accordance with various embodiments. Controller 110 may be capable of carrying out the steps of FIG. 3. Method 200 performed by controller 110 may include the steps of receiving sensor data (step 202), determining WOW (step 204), calculating a wheel speed (step 206), determining braking (step 208), determining a status of the aircraft (step 210), and controlling lights (step 212).

Step 202 may comprise receiving, by controller 110, data from one or more sensor 90, such as WOW sensor 120, wheel speed sensor 122, brake sensor 124, aircraft data source 112, and/or other sensor. Sensor data may comprise WOW information, wheel speed, wheel position, wheel acceleration, brake pressure, brake pedal angle, steering angle, aircraft altitude, yaw, groundspeed, airspeed, or other parameter or characteristic of the aircraft.

Step 204 may comprise determining, by controller 110, if WOW sensor 120 indicates that there is WOW and the aircraft is on the ground, or if there is no WOW and the aircraft is in flight. Step 204 may comprise determining, by controller 110, whether the aircraft is on the ground or in flight using other sensor information, such as braking information, wheel speed information, and/or data from aircraft data source 112.

Step 206 may comprise calculating a wheel speed, i.e., an angular velocity, of each of the landing gear wheels based on sensor measurements or data from one or more wheel speed sensors 122. In various embodiments, wheel speed sensors 122 may measure angular displacement of the wheels. A measurement of angular displacement over time allows controller 110 to calculate wheel speed (the scalar of angular velocity). The acceleration of a wheel may also be derived based on the angular velocity or wheel speed over time. In various embodiments, wheel speed sensors 122 measure wheel speed directly as an angular or rotational velocity, such as rotations per minute (RPM) or radians per second (rad/s).

Step 208 may comprise deriving from one or more brake sensors 124 whether a braking input has been received to effect braking. Braking may be detected by deflection of the brake pedal (e.g., a brake command issued by the pilot). Brake sensors 124 may comprise pressure sensors, and braking may be determined, for example, based on fluid pressure supplied to the brakes. Such pressure can be measured, for example, by the brake sensors 124 and communicated to controller 110. For example, if the brake pressure exceeds a predetermined threshold, then it can be concluded that brake application is occurring. Conversely, if the measured brake pressure does not exceed the predetermined threshold, then it can be concluded that brake application is not occurring. Other means in which brake application may be detected include determining a deceleration rate of the wheels of landing gear 104, 106, 108. Such deceleration rate may be calculated by controller 110 based on data provided by the wheels speed sensors 122. If the deceleration rate is greater than a predetermined threshold, then it can be concluded that brake application is occurring, and if it not greater that the predetermined threshold, then it can be concluded that brake application is not occurring. Other means of detecting deceleration of aircraft 10 may include determining if the thrust reversers are deployed. Controller 110 may receive data from aircraft data source 112 indicating whether thrust reversers are deployed, wherein thrust reverser deployment may indicate that aircraft 10 is decelerating.

Step 210 may comprise determining a status of the aircraft, for example, whether the aircraft is taxiing, taxiing above or below a threshold speed or a threshold acceleration, turning, braking, taking off, in flight, above or below a threshold altitude, landing, stopped and/or parked. Determining the status of the aircraft may be based on data from one or more sensors, such as from WOW sensor 120, wheel speed sensor 122, brake sensor 124, aircraft data source 112, and/or other sensors.

Step 212 may further comprise activating and/or deactivating lights of light system 20, including a taxi light 22, a runway turnoff light 24, a takeoff light 26, a landing light 28, a logo light 30, and/or a novelty light 50 based on the status of aircraft 10. Controller 110 may implement logic to activating and/or deactivating lights at proper timing to improve pilot visibility and/or aircraft visibility.

In various embodiments as used herein, "activate" or "activating" a light refers to turning-on and/or increasing a brightness of the light, while "deactivate" or "deactivating" a light refers to turning-off and/or decreasing a brightness of the light.

Figure 4A:
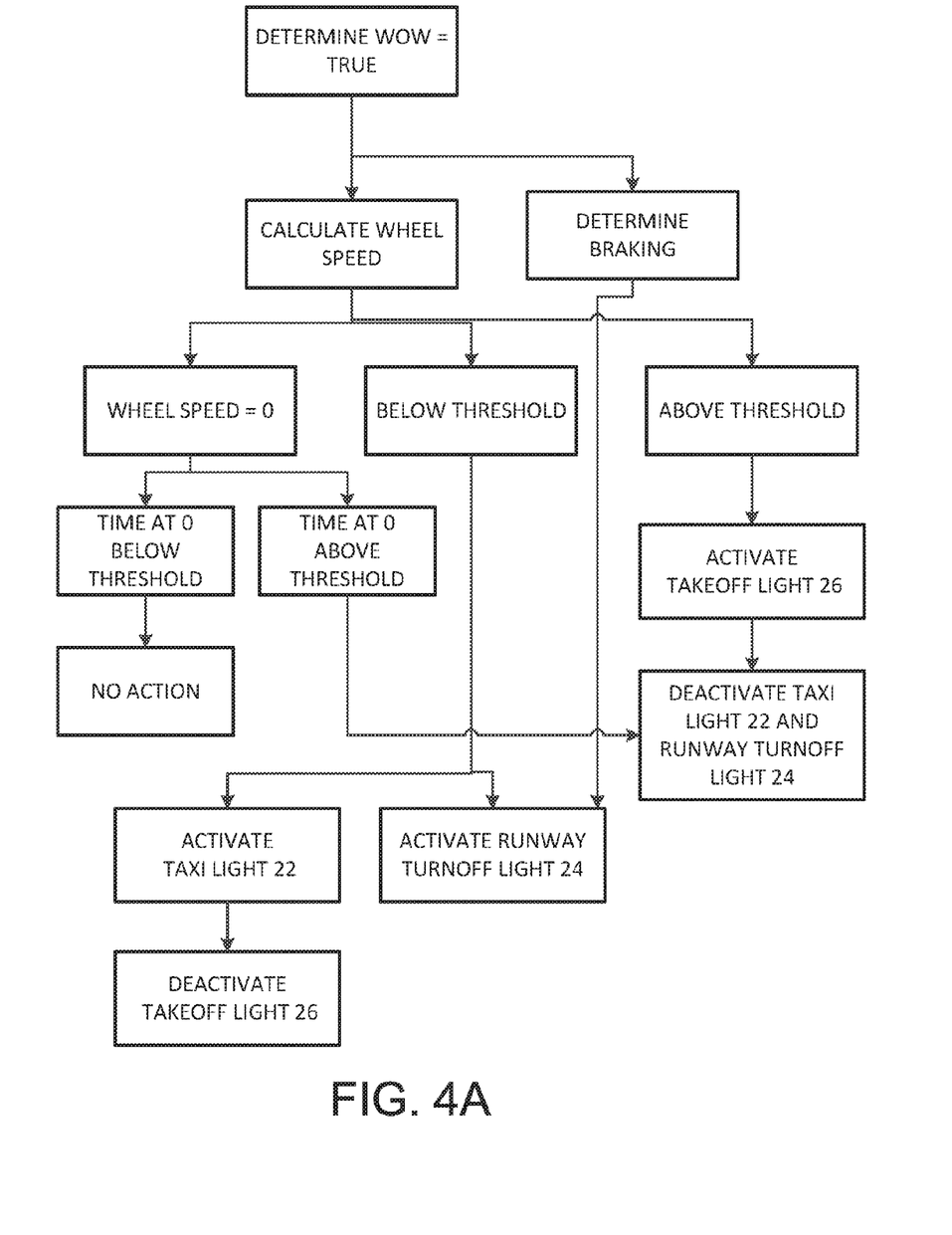
FIGS. 4A, 4B, and 4C illustrate logical flow diagrams for controlling an aircraft light system, in accordance with various embodiments.

FIG. 4A illustrates a logical flow diagram for a controller 110 implementing method 200 for controlling light system 20, in accordance with various embodiments. In various embodiments, controller 110 may determine that the aircraft 10 is taxiing, and in response, controller 110 may activate taxi light 22 and runway turnoff light 24. If wheel speed is below a threshold speed and WOW is true, indicating that the aircraft is taxiing, controller 110 may activate taxi light 22 and runway turnoff light 24. If wheel speed is below a threshold speed and WOW is true, indicating that the aircraft is taxiing below a threshold speed, controller 110 may deactivate takeoff light 26.

Controller 110 may determine that the aircraft 10 is stopped in runway traffic, and in response, controller 110 may deactivate taxi light 22 and runway turnoff light 24. If wheel speed is zero and WOW is true, and wheel speed is zero for a minimum threshold time, controller 110 may deactivate taxi light 22 and runway turnoff light 24. If wheel speed is zero and WOW is true, but wheel speed has been at zero for under a minimum threshold time, controller 110 may take no action with respect to taxi light 22 and runway turnoff light 24.

Controller 110 may determine that the pilot is braking and may activate one or more runway turnoff lights 24. If wheel speed is below a threshold speed and WOW is true, and braking is detected, controller 110 may activate runway turnoff light 24.

Controller 110 may determine that the aircraft 10 is taking off, and in response, controller 110 may deactivate taxi light 22 and runway turnoff light 24 and may activate takeoff light 26. If wheel speed is above a threshold speed and WOW is true, indicating that the aircraft is taking off, controller 110 may activate takeoff light 26 and may deactivate taxi light 22 and runway turnoff light 24. In various embodiments, controller 110 may delay the deactivation of taxi light 22 until after takeoff light 26 is activated. Controller 110 may further transition between activation and deactivation of lights by fading or dimming a brightness of each light. For example, a brightness of takeoff light 26 may be increased to 25% illumination, while a brightness of taxi light 22 may be decreased to 75% illumination. Subsequently, the brightness of takeoff light 26 may be increased to 75% illumination, while a brightness of taxi light 22 may be decreased to 25% illumination. The dimming of taxi light 22 may proceed until taxi light 22 is off, while increasing the brightness of takeoff light 26 may proceed until takeoff light 26 is at 100% illumination, or at the desired illumination. Thus, the transition between the various lights throughout the various stages of operation of aircraft 10 may allow a pilot's eyes to adjust to the light transitions more easily.

Figure 4B:
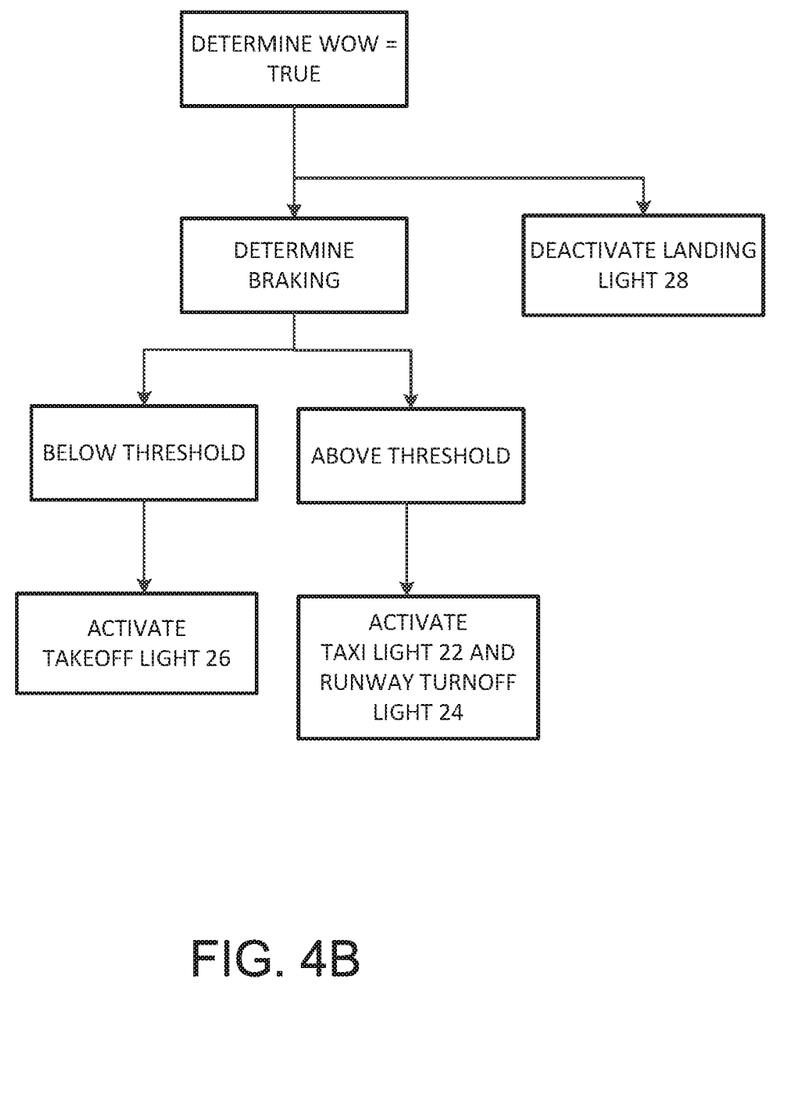

FIG. 4B illustrates a logical flow diagram for a controller 110 implementing method 200 for controlling light system 20, in accordance with various embodiments. In various embodiments, controller 110 may determine that the aircraft 10 is transitioning from taxiing to takeoff. Controller 110 may determine that aircraft 10 is beginning takeoff by the presence of WOW, steering aimed forward of the nose, braking being below a threshold (indicating a release of brakes or an absence of braking), aircraft acceleration above a threshold, wheel speed above a threshold or other sensor information or combination thereof. Braking may be below a threshold, indicated by low or negligible brake pressure, when the pilot releases the brakes in preparation for takeoff. For example, if brake pressure is low or negligible and WOW is true, indicating that the aircraft is transitioning from taxiing to takeoff, controller 110 may activate takeoff light 26, and may further deactivate taxi light 22 and runway turnoff light 24.

Controller 110 may determine that the aircraft 10 has rejected takeoff or has otherwise transitioned to taxiing on the ground, and in response, controller 110 may activate taxi light 22 and runway turnoff light 24. Controller 110 may determine that aircraft 10 is taxiing if braking is above a threshold. For example, if brake pressure is above a threshold and WOW is true, indicating that the aircraft is taxiing, controller 110 may activate taxi light 22 and runway turnoff light 24, and may deactivate takeoff light 26. Further, controller 110 may determine that the aircraft 10 has rejected takeoff or has otherwise transitioned to taxiing on the ground, and in response, controller 110 may deactivate landing light 28. For example, if WOW is true, controller 110 may deactivate landing light 28.

Figure 4C:
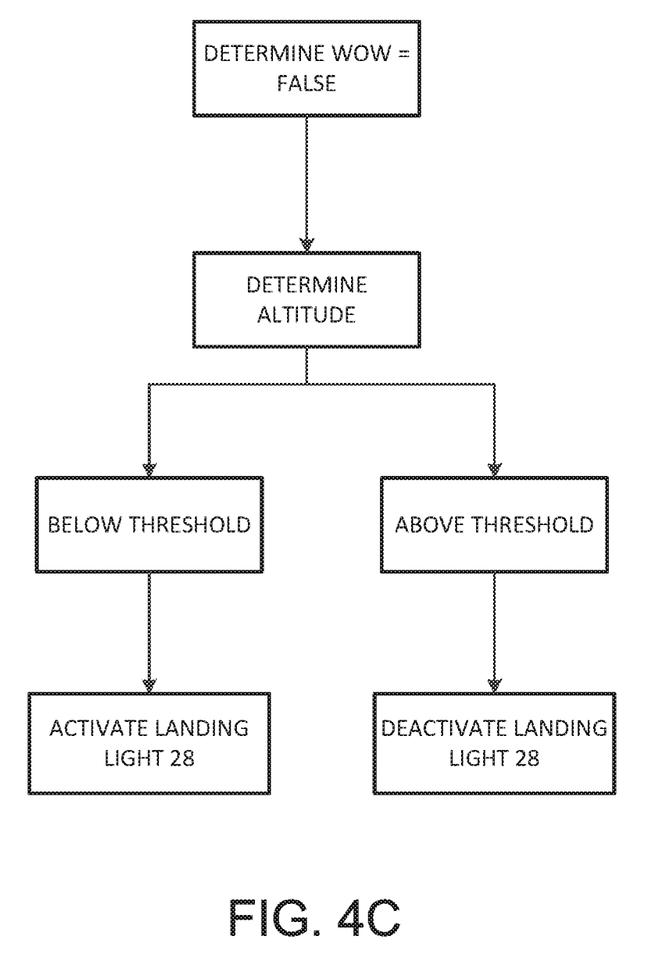

FIG. 4C illustrates a logical flow diagram for a controller 110 implementing method 200 for controlling light system 20, in accordance with various embodiments. Controller 110 may determine that the aircraft 10 has completed takeoff and is in flight, and in response, controller 110 may activate landing light 28 and may deactivate takeoff light 26. After takeoff, WOW sensor 120 may change from an on-ground state to an in-flight state by indicating that there is no longer WOW and the aircraft is in flight. In various embodiments, controller 110 may receive data from aircraft data source 112 to determine an altitude of the aircraft. Controller 110 may determine that the aircraft 10 is above a first threshold, such as a threshold altitude, and in response, controller 110 may deactivate landing light 28. Controller 110 may deactivate the landing light 28 upon after determining the altitude of the aircraft is above a first threshold of 10,000 feet.

Controller 110 may determine that the aircraft 10 is below the first threshold, such as the threshold altitude, and in response, controller 110 may activate landing light 28 and logo light 30. Controller 110 may activate the landing light 28 upon after determining the altitude of the aircraft is below the first threshold of 10,000 feet.

Landing may be indicated by weight on wheels, high wheel speed, and high concurrent braking command, among other indicators. Controller 110 may determine that the aircraft 10 has landed on the runway 102, and in response, controller 110 may deactivate landing light 28 and may activate takeoff light 26. Controller 110 may determine that the aircraft is landing by determining whether a nose landing gear 104 is in contact with the ground. If wheel speed is above a threshold and WOW is true, controller 110 may activate takeoff light 26 in response to the nose landing gear 104 being in contact with the ground. Controller 110 may deactivate the landing light 28 in response to the nose landing gear being in contact with the ground. Other indicators of landing may include deceleration above a threshold and braking signal above a threshold.

Controller 110 may determine that the aircraft 10 has decelerated from a landing speed to a taxiing speed, and in response, controller 110 may deactivate takeoff light 26 and may activate taxi light 22 and runway turnoff light 24. Controller 110 may determine that the aircraft 10 is parked, and in response, controller 110 may deactivate taxi light 22 and runway turnoff light 24 and may activate novelty lights 50. If WOW is true, the wheel speed data, in conjunction with the absence or presence of a pilot braking command, can be used to determine whether the aircraft 10 is parked or stopped. A wheel speed below a predetermined threshold along with the absence of a pilot braking command may indicate that the aircraft is parked. When aircraft 10 is parked, additional service lights, logo lights 30, or novelty lights 50 may be illuminated.

The present disclosure describes a light system. Such light systems may be used in aircraft systems. However, the systems and methods of the present disclosure may be suitable for use in non-aircraft systems as well. In various embodiments, the light systems described herein may be used with any suitable aircraft and/or vehicle with lights (e.g., a commercial aircraft, a military aircraft, a helicopter, an un-manned aircraft, and/or the like).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A light system for an aircraft, comprising:
   a sensor;
   a first aircraft light;
   a controller coupled to the sensor and the first aircraft light; and
   a tangible, non-transitory memory configured to communicate with the controller, the tangible, non-transitory memory having instructions stored thereon that, in response to execution by the controller, cause the controller to perform operations comprising:
   receiving, by the controller, data from the sensor;
   determining, by the controller, a status of the aircraft based on the data; and
   controlling, by the controller, the first aircraft light based on the status of the aircraft,
   wherein the sensor comprises a wheel speed sensor, and the first aircraft light comprises a taxi light, and
   wherein the operations further comprise activating, by the controller, the taxi light in response to a wheel speed being below a speed threshold.

2. The light system of claim 1, wherein the first aircraft light includes an external aircraft light and the operations further comprise at least one of activating or deactivating, by the controller, the external aircraft light based on the status of the aircraft.

3. The light system of claim 1, wherein the sensor comprises a weight-on-wheels sensor and the first aircraft light comprises a landing light, and wherein the operations further comprise:

determining, by the controller, based on the data whether a landing gear of the aircraft is in contact with a ground; and deactivating, by the controller, the landing light in response to the landing gear being in contact with the ground.

4. The light system of claim 3, further comprising a second aircraft light including a takeoff light, wherein the operations further comprise activating, by the controller, the takeoff light in response to the landing gear being in contact with the ground.

5. The light system of claim 1, wherein the sensor comprises an aircraft data source and the first aircraft light comprises a landing light, and wherein the operations further comprise activating, by the controller, the landing light upon determining an altitude of the aircraft is below a first threshold.

6. The light system of claim 1, wherein the sensor comprises a brake sensor and the first aircraft light comprises a runway turnoff light, and wherein the operations further comprise activating, by the controller, the runway turnoff light in response to a brake signal from the brake sensor.

7. An article of manufacture including a non-transitory, tangible computer readable storage medium having instructions stored thereon that, in response to execution by a controller, cause the controller to perform operations comprising:

receiving, by the controller, data from a sensor;

determining, by the controller, a status of the aircraft based on the data; and controlling, by the controller, a first aircraft light based on the status of the aircraft, wherein the sensor comprises a wheel speed sensor, and the first aircraft light comprises a taxi light, and wherein the operations further comprise activating, by the controller, the taxi light in response to a wheel speed being below a speed threshold.

8. The article of manufacture of claim 7, wherein the first aircraft light includes an external aircraft light and the operations further comprise at least one of activating or deactivating, by the controller, the external aircraft light based on the status of the aircraft.

9. The article of manufacture of claim 7, wherein the sensor comprises a weight-on-wheels sensor and the first aircraft light comprises a landing light, and wherein the operations further comprise:

determining, by the controller, based on the data whether a landing gear of the aircraft is in contact with a ground; and deactivating, by the controller, the landing light in response to the landing gear being in contact with the ground.

10. The article of manufacture of claim 9, further comprising a second aircraft light including a takeoff light, wherein the operations further comprise activating, by the controller, the takeoff light in response to the landing gear being in contact with the ground.

11. The article of manufacture of claim 7, wherein the sensor comprises an aircraft data source and the first aircraft light comprises a landing light, and wherein the operations further comprise activating, by the controller, the landing light upon determining an altitude of the aircraft is below a first threshold.

12. A method of controlling a light system of an aircraft, comprising:

receiving, by a controller, data from a sensor;

determining, by the controller, a status of the aircraft based on the data; and controlling, by the controller, a first aircraft light based on the status of the aircraft, wherein the first aircraft light includes a taxi light, and wherein the controlling the first aircraft light further comprises activating, by the controller, the taxi light in response to a wheel speed being below a speed threshold.

13. The method of claim 12, wherein the first aircraft light includes an external aircraft light, wherein the controlling the first aircraft light further comprises at least one of activating or deactivating, by the controller, the external aircraft light based on the status of the aircraft.

14. The method of claim 12, wherein the sensor comprises a weight-on-wheels sensor and the first aircraft light comprises a landing light.

15. The method of claim 14, further comprising:

determining, by the controller, based on the data whether a landing gear of the aircraft is in contact with a ground; and deactivating, by the controller, the landing light in response to the landing gear being in contact with the ground.

16. The method of claim 15, further comprising:

determining, by the controller, an altitude of the aircraft; and activating, by the controller, the landing light upon determining the altitude of the aircraft is below a first threshold.

17. The method of claim 16, further comprising activating, by the controller, a second aircraft light in response to the landing gear being in contact with the ground, wherein the second aircraft light comprises a takeoff light.

* * * * *